UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

HEALING-SOAP.

SPECIFICATION forming part of Letters Patent No. 273,236, dated February 27, 1883.

Application filed February 25, 1882. (No specimens.)

*To all whom it may concern:*

Be it known that I, JAMES J. JOHNSTON, of Columbiana, in the county of Columbiana and State of Ohio, have invented a certain new and useful Improvement in Medicinal Soap; and I do hereby declare that the following is a full, clear, and exact description thereof.

My invention relates to an improvement in medicinal soap; and it consists in making said soap of tallow, petroleum-oil, rosin, lime, soda-ash, and a decoction of the berries and bark of prinos, said prinos being familiarly known as "black-alder" or "winter-berry" or "fever-bush," said ingredients being used in quantities and proportions and treated in the manner hereinafter described.

To enable others skilled in the art with which my invention is most nearly connected to make and use it, I will proceed to describe its construction and operation.

I take about ten (10) pounds of pure tallow and about ten (10) pounds of petroleum-oil distilled in the manner described in Letters Patent No. 31,982, granted to me April 9, 1861, said oil being of specific gravity of about 35°, and about forty (40) pounds of rosin. I melt the tallow and rosin in an apparatus described in an application of even date with this, and designated "Division A," at a temperature not over two hundred degrees (200°) Fahrenheit; then gradually add the ten (10) pounds of petroleum-oil; then take about eight (8) pounds of lime and sixteen (16) pounds of soda-ash, and triturate the lime and soda-ash until they become mechanically a homogeneous mass, which is dissolved in about forty (40) pounds of strong decoction of prinos made from the bark and berries combined or separately, said decoction being at a temperature of about one hundred and fifty degrees (150°) Fahrenheit, adding gradually and slowly the mass of lime and soda-ash combined, stirring the decoction while so doing, and after sufficient time has been allowed for the undissolved particles of lime and soda-ash to precipitate the solution is carefully "racked off" from the precipitated matter, the melted tallow, rosin, and the oil in the caldron of said apparatus are thoroughly agitated, and during the agitation the solution described is gradually added, after which the whole mass is kept in an agitated state at a temperature of about two hundred degrees (200°) Fahrenheit for about two hours. It is then allowed to gradually cool (still keeping up the agitation) until it has fallen to a temperature of about one hundred and twenty degrees (120°) Fahrenheit, at which point it is dipped out into molds, and when congealed is subsequently cut into bars or cakes, as may be desired.

The soap hereinbefore described will be an excellent compound for the washing of cankerous and malignant sores, and for persons afflicted with scalp diseases or other affection of the skin.

I am aware that it is common to use petroleum-oil in the manufacture of soap, an example of which is found in the patent of Stephen K. Kane, No. 63,528, and dated April 2, 1867, and therefore do not claim broadly the use of petroleum; but, in contradistinction to the ordinary distilled petroleum-oil, I use said oil mixed with wood-charcoal in the still, and subsequently distill the oil at a low degree of heat, as described in the before-mentioned patent.

Having thus described my improvement, what I claim as my invention is—

A medicinal soap made of tallow, petroleum-oil, distilled as hereinbefore described, rosin, lime, soda-ash, and a decoction of prinos, in the quantities and proportions and treated in the manner hereinbefore specified, and for the purpose set forth.

JAMES J. JOHNSTON.

Witnesses:
T. D. D. OURAND,
D. P. COWL.